United States Patent [19]

Calmanti et al.

[11] 4,231,841
[45] Nov. 4, 1980

[54] PROCESS FOR THE DE-INKING OF PRINTED WASTE PAPER

[75] Inventors: Giulio Calmanti; Salvatore Gafa, both of Milan; Giovanni M. Dadea, Tradate; Alfonso Gatti, Novi Ligure; Fulvio Burzio, Milan, all of Italy

[73] Assignee: Montedison S.p.A., Milan, Italy

[21] Appl. No.: 952,200

[22] Filed: Oct. 17, 1978

[30] Foreign Application Priority Data

Oct. 20, 1977 [IT] Italy .............................. 28816 A/77
Sep. 1, 1978 [IT] Italy .............................. 27242 A/78

[51] Int. Cl.³ .............................................. D21C 5/02
[52] U.S. Cl. ........................................... 162/5; 162/8; 162/60; 162/6
[58] Field of Search .................... 162/4, 5, 6, 7, 8, 55, 162/60; 252/121, 135, 556, 559; 210/441

[56] References Cited

U.S. PATENT DOCUMENTS

| | | | |
|---|---|---|---|
| 2,005,742 | 6/1935 | Hines | 162/5 |
| 3,354,028 | 11/1967 | Illingworth et al. | 162/5 |
| 3,377,234 | 4/1968 | Illingworth | 162/5 |
| 3,446,696 | 5/1969 | Illingworth | 162/5 |
| 3,994,770 | 11/1976 | Lausch | 162/5 |

FOREIGN PATENT DOCUMENTS

| | | | |
|---|---|---|---|
| 2311674 | 9/1974 | Fed. Rep. of Germany | 162/5 |
| 49-47604 | 5/1974 | Japan | 162/5 |
| 52-114709 | 9/1977 | Japan | |
| 1025783 | 4/1966 | United Kingdom | |

OTHER PUBLICATIONS

Escher Wyss News, vol. 44, 1971(1).
"The Technical Bulletin", E. I. Du Pont, vol. 6, No. 3, 9/1950, pp. 117–119.

*Primary Examiner*—William F. Smith

[57] ABSTRACT

A de-inking composition is disclosed consisting substantially of:

(A) a salt of a fatty acid of the formula: R—COO—M wherein R represents one or more hydrocarbon chains selected from the class consisting of saturated and/or unsaturated hydrocarbons; and M represents a metal selected from the class consisting of Na and K; said fatty acid salt being present in an amount between 5% and 32% with respect to the weight of the entire composition;

(B) a non-ionic ethoxylated and/or propoxylated surfactant of the formula:

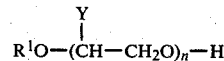

wherein:
Y is either H or CH₃;
R¹O represents the hydrophobic moiety of the molecule and is derived from a compound selected from the class consisting of alkylphenols of formula

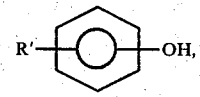

saturated primary fatty alcohols of formula R'''—CH₂OH; saturated secondary fatty alcohols of formula R'''

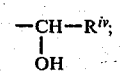

fatty acids of the formula $R^v$—COOH; and mixtures thereof, wherein R', R'', R''', $R^{iv}$ and $R^v$ are alkyl chains; and n is a number between 2 and 40; said non-ionic surfactant being present in an amount between 5% and 25% by weight of the entire composition;

(C) an anionic surfactant selected from the class consisting of sulphonates of the formula R²—SO₃—M'; sulphates of formula R³—O—SO₃—M' and mixtures thereof, wherein:
R² is selected from the class consisting of linear paraffin chains, olefine chains, and alkylaryl chains;

R$^3$ is a paraffin chain; and M' is selected from the class consisting of Na, K, NH$_4$ and mono-, di- and tri-substituted alkylamines; said anionic surfactant being present in an amount between 2% and 8% with respect to the weight of the entire composition;

(D) a sodium-carboxylmethyl-cellulose in an amount between 1% and 5% with respect to the weight of the entire composition; and (E) an alkaline inorganic salt selected from the class consisting of metasilicate, disilicate, carbonate, borate and polyphosphates, said alkaline inorganic salt being present in an amount between 30% and 80% of the entire composition; the percentages of the components (A), (B), (C), (D) and (E) totaling essentially 100%.

A process of de-inking is also disclosed.

5 Claims, 1 Drawing Figure

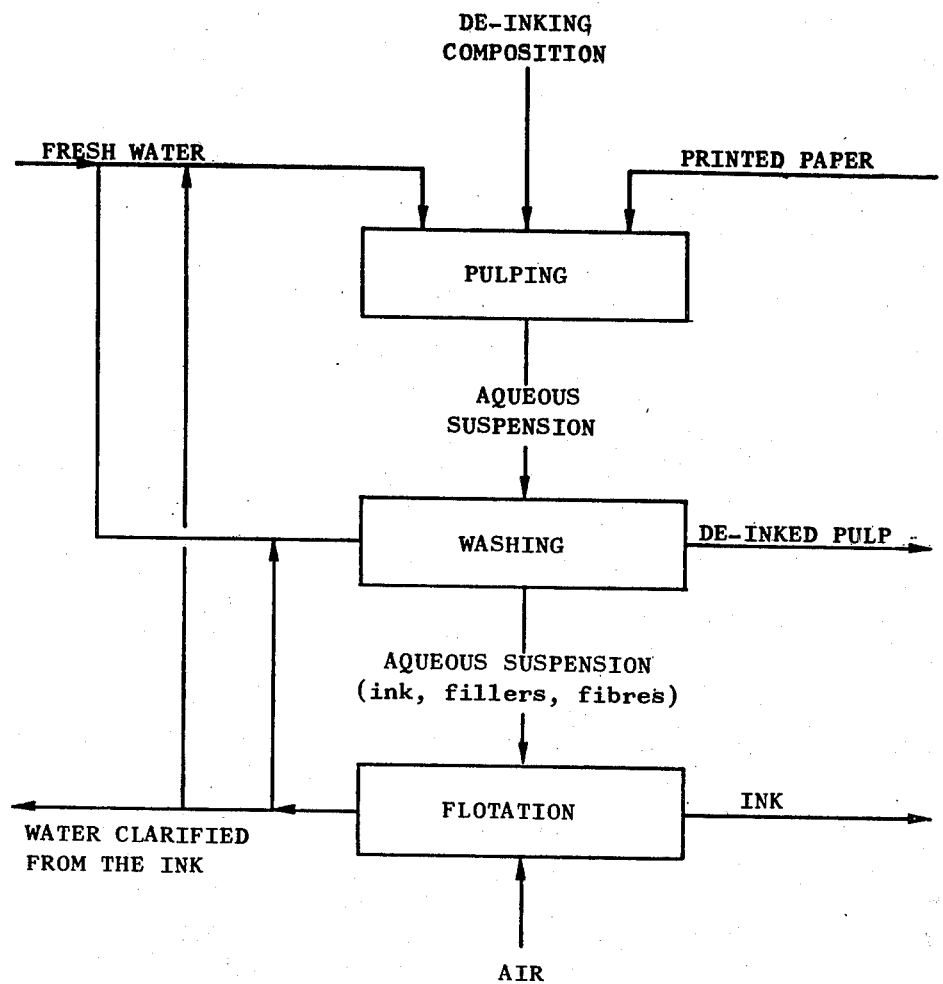

PROCESS FOR THE DE-INKING OF PRINTED WASTE PAPER

The present invention relates to a composition and a process for the de-inking of printed waste paper. The de-inking of printed waste paper aims at removing the printing ink from the paper and at recovering a paper pulp that may be re-utilized for preparing printing paper for newspapers, magazines, books, etc. The printing paper consists essentially of cellulose fibers and fillers, while the printing ink consists of pigments kept together by suitable vehicles.

One of the best known de-inking processes is the so-called washing process which is based on a pulping of the paper in water and on the successive washing of the thus-obtained suspension.

In the pulping in water, the printed waste paper is crushed and fiberized in an alkaline medium, with the aid of heat, mechanical stirring, and suitable de-inking compositions which remove more or less thoroughly the ink from the paper fibers.

The washing consists of a series of thickenings and dilutions of the aqueous solution obtained from the pulping of the waste paper, and has for its object to obtain two aqueous suspensions: a more diluted suspension containing the possibly greatest part of the ink, and a thicker suspension containing paper fibers that are as free as possible from the ink. This latter suspension is used for the manufacture of new paper.

In practice, in the known de-inking processes based on washing, the suspension of the ink contains a considerable amount of paper fibers and fillers, and must thus be suitable treated before being partially recycled or discharged as an effluent. In general, said suspension is additioned with flocculants consisting of polyelectrolytes and is then subjected to flotation in an acid or neutral medium. Proceeding in this way, however, the fibers and mineral fillers are floated together with the ink, wherefore, together with the floated mass an important part of fibers and mineral fillers is lost, which would be useful for the preparation of new paper.

Thus, and summing up, it may be said that with the de-inking compositions of the prior art and with the known de-inking washing processes the yield in recovered paper is in general relatively low.

Still another drawback of the known de-inking processes by washing consists in that the floated mass, in as much as it contains a considerable amount of fibers, displays a considerable volume and, as such, is thus difficult to be disposed of.

Moreover, the clarified water obtained downstream of the flotation step may be recycled only in limited quantities to the pulping step and/or to the washing step, because of the considerable content in electrolytes originating from the pH corrections and from the addition of flotation salts. This involves the drawback of being compelled to dispose of large masses of water employed in carrying out the overall process. Moreover, if it is desired to recycle part of the clarified acid water, it is necessary to correct the pH with the consequential consumption of reactants due to the fact that in the pulping and washing steps one works in an alkaline medium.

Thus, an important object of this invention is that of providing a new composition that, when used in de-inking processes by washing, will enable one to de-ink printed waste paper with the production of a pulp having a high brightness and with a high yield during the recovery step.

Still another object of this invention is that of providing a de-inking process by washing which will enable one, with a limited consumption of reactants and with limited masses of processing water, to recover with a high yield a recovered pulp having a high brightness.

In accordance with this invention, a new de-inking composition has now been found which will enable one readily to achieve the objects mentioned above. This new composition consists essentially of:

(A) a salt of a fatty acid of the formula: R—COO—M wherein R represents one or more hydrocarbon chains selected from the class consisting of saturated and/or unsaturated hydrocarbons; and M represents a metal selected from the class consisting of Na and K;

(B) a non-ionic ethoxylated and/or propoxylated surfactant of the formula:

wherein:
Y is either H or $CH_3$;
$R^1O$ represents the hydrophobic moiety of the molecule and is derived from a compound selected from the class consisting of alkylphenols of formula

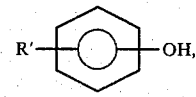

saturated primary fatty alcohols of formula $R''—CH_2OH$; saturated secondary fatty alcohols of formula $R'''$

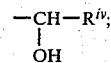

fatty acids of the formula $R^v—COOH$; and mixtures thereof, wherein $R'$, $R''$, $R'''$, $R^{iv}$ and $R^v$ are alkyl chains; and n is a number between 2 and 40;

(C) an anionic surfactant selected from the class consisting of sulphonates of the formula $R^2—SO_3—M'$; sulphates of formula $R^3—O—SO_3—M'$; and mixtures thereof, wherein:

$R^2$ is selected from the class consisting of linear paraffin chains, olefine chains, and alkylaryl chains;

$R^3$ is a paraffin chain; and

M' is selected from the class consisting of Na, K, $NH_4$ and mono-, di- and tri-substituted alkylamines;

(D) a sodium-caryboxylmethyl-cellulose; and (E) an alkaline inorganic salt selected from the class consisting of metasilicate, disilicate, carbonate, borate and polyphosphates.

The above-indicated compounds are present in the de-inking composition of this invention in the following percentage ranges by weight:

| | |
|---|---|
| A | 5–32% |

| | |
|---|---|
| B | 5–25% |
| C | 2–8% |
| D | 1–5% |
| E | 30–80% | for a total of 100%. These percentages relate to compositions considered as in the pure state.

Component A is practically a soap, that is, an alkaline salt of a fatty acid or, more commonly, of a mixture of fatty acids with hydrocarbon chains R having from 9 to 21 carbon atoms. Of the various fatty acids that are suitable, the preferred one is hydrogenated tallow.

Component B is a non-ionic ethoxylated and/or propoxylated surfactant whose hydrophobic component $R^1O$ derives from one or more of the following compounds:

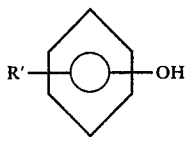

alkylphenols in which the alkyl chain $R'$ has a number of carbon atoms between 8 and 12 (in this case, thus, $R^1O$ is represented by

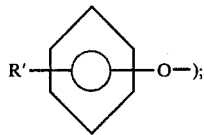

—primary saturated fatty alcohols $R''$—$CH_2OH$, in which the alkyl chain $R''$ has a number of carbon atoms between 8 and 19 (thus, in this case $R^1O$ is represented by: $R''$—$CH_2$—O);

—secondary saturated fatty alcohols

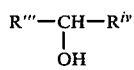

in which the alkyl chains $R'''$ and $R^{iv}$ have overall a number of carbon atoms between 8 and 19 (in this case $R^1O$ is thus represented by

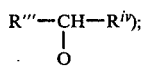

and

—saturated and/or unsaturated fatty acids $R^v$—COOH, in which the alkyl chain $R^v$ has a number of carbon atoms between 9 and 21 (in this case $R^1$ O is represented by $R^v$—COO).

Component C is an anionic surfactant consisting of a sulphonate $R^2$—$SO_3$—$M'$ and/or of a sulphate $R^3$—O—$SO_3$—$M'$. The radical $R^2$ of the sulphonate may consist of:

—a linear paraffin chain having a number of carbon atoms between 10 and 20, but preferably between 15 and 18;

—an olefinic chain with a number of carbon atoms between 10 and 20, but preferably between 14 and 18; or
—an alkyl-aryl chain

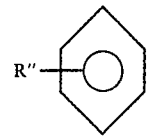

wherein $R''$ is an alkyl chain with a number of carbon atoms between 10 and 14.

The $R^3$ radical of the sulphate is a paraffin chain with a number of carbon atoms between 10 and 20.

Component D is a sodium-carboxylmethyl-cellulose of the formula:

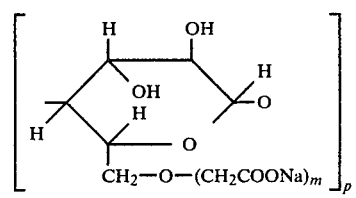

wherein:
m is the degree of substitution of the sodium-carboxymethylene groups and is between 0.5 and 1, but preferably between 0.6 and 0.8; and
p is the degree of polymerization and is between 600 and 1500, but preferably between 700 and 900.

Component E of the de-inking composition according to this invention consists essentially of an alkaline inorganic salt selected from the class consisting of metasilicate, disilicate, carbonate, borate and polyphosphates. Sodium salts are preferred, and in particular sodium metasilicate.

The composition of this invention is prepared by the simple physical mixing together of the components. The composition may be in the form of a powder or a paste, depending on the components used and on their proportions.

If desired, the five components consistituting the composition of this invention may be introduced separately, provided they are in suitable weight ratios to each other, directly into the equipment in which the pulping of the printed waste paper takes place.

The composition of this invention is not toxic; it does not require special precautions for its handling; and it contains anionic and non-ionic surfactants that are at least 90% biodegradable.

Still another object of this invention is that of providing a process for the de-inking of printed waste paper, characterized in that the paper is pulped in water additioned with the above-described composition.

More particularly, it has surprisingly been found that when the printed paper is subjected to a de-inking process by washing, and if the composition of this invention is used during the pulping step, the suspension of the ink obtained at the end of the pulping step may be effectively subjected to flotation in an alkaline medium without any flocculant. This flotation, by simply blowing in air, occurs in a selective way, that is to say, it allows one to remove prevalently the ink.

Thus, a further object of this invention is a particular process for the de-inking of printed waste paper. This process consists essentially of the following two steps:

(a) a pulping in which the printed paper is treated in an alkaline medium with water additioned with a de-inking agent, in a reactor fitted with a stirring system; and (b) one or more washing steps from which there are obtained two separate suspensions, one containing de-inked paper, the other containing ink, fillers and paper fibers.

According to this invention the above-mentioned process is characterized in that:

(a) in the pulping an aqueous suspension containing printed waste paper, in a quantity of 3-15% by weight, and the composition according to this invention in a quantity equal to 1-6% by weight with respect to the weight of the paper, is treated at a 9-12 pH;

(b) the suspension containing ink, fillers and paper fibers, as obtained from the washing, is subjected to flotation at a pH of about 9, by the blowing of air, thereby separating two phases, a thickened phase containing the ink, and the other phase consisting of de-inked clarified water and containing in suspension paper fibers and fillers; and (c) the water clarified from the ink, obtained from the flotation, is totally or partially recycled back to the pulping and the washing steps.

The process may be carried out either in a continuous way or batchwise, with excellent results with any type of paper (even when containing many fillers), and with any type of print: daily newspapers (letter-press or off-set), illustrated magazines (coated or uncoated), electronic computer tabulations, paper of archives with or without mechanical pulp, trimmings from typographical or from paper-working industries, printed polyethylenized cardboards, etc.

The above-mentioned process is illustrated schematically in the attached drawing.

In the practical realization of the process of this invention, the pulping is carried out in a conventional pulping apparatus into which water, printed paper, and chemical additives are fed.

The water may be clarified recycled water from the succeeding flotation step, or a mixture of fresh water and recycled water, or just fresh water.

The waste paper is fed in such a way as to obtain a quantity of solids in the water equal to 3-15% by weight.

The de-inking composition of this invention is added in quantities of 1-6% by weight (preferably 2-4%) with reference to the weight of the paper. The amount of composition of the invention to be used depends on the type of paper and on the type of print.

In general, in the pulping step it is preferable to feed in first a part of the water and then, in the given order: de-inking composition, paper, and then the remaining water.

When operating batchwise, the pulping is preferably carried out for a period of time between 8 and 35 minutes (usually 10-30 minutes), and at a temperature of 30°-80° C. This temperature may be obtained by the direct heating of the pulping apparatus or by preheating the water. After pulping, the cycle goes on without further heating.

In the case in which the cycle is batchwise, it is convenient to have the pulping apparatus followed by one or more storage vats which will serve for the feeding of the successive apparatuses. The dwell time in the storage vats is not critical.

The suspension obtained by the pulping is then conveyed to the successive washing operations that are carried out per se according to the known prior art, using however, besides fresh water, possibly also part of the clarified water obtained from succeeding flotation stage, without any corrections of the pH, in as much as the cycle remains always in an alkaline medium. The washing operations are carried out in conventional equipment, common to all the installations of this kind.

Usually the washing comprises the so-called screening step and a washing step proper. The screening aims at eliminating the heavier and rougher particles (for instance metal staples) as well as the lighter ones (e.g. plastic materials) while the washing step has the aim of obtaining the removal of the ink through the waters and to separate a de-inked paper.

The washing proper consists generally in dilutions followed by countercurrent filterings with water, and is preferably conducted in three or more steps.

The de-inked paper obtained from the washing may be subjected to either an oxidizing or a reducing bleaching according to per se known techniques.

In the process of this invention there may be conveniently coupled to the pulping step an oxidizing bleaching with hydrogen peroxide. In this case the pulping is preferably carried out at 50°-80° C., adding, besides the already-indicated additives, a quantity of hydrogen peroxide equal to 0.5-3% by weight, with respect to the weight of the paper, and by maintaining the suspension thus obtained in one or more storage vats for at least 40 minutes. Usually it is advisable to have a dwelling time of 40-120 minutes, although longer times are equally applicable.

The suspension obtained from the washing contains ink, small-sized cellulose fibers and fillers. This suspension is conveyed into one or more flotation vats in which the pH is in general maintained at about 9.

In floating by simple blowing of air, and without any flocculant, there takes place a selective separation of the ink which is removed by means of the overflowing foam, while the clarified waters containing cellulose fibers and fillers may also be fully recycled back to the pulping and washing stages. The total quantity of recycled clarified water and its distribution between the pulping and the washing steps depend on the dilutions that one wishes to obtain respectively in those steps.

Summing up, the advantages of the process of this invention, with respect to the prior art de-inking processes, are the following:

—the possibility of carrying out a selective flotation of the ink and a recycling, which may even be total, of the clarified water containing cellulose fibers, thereby achieving recovery yields of the paper greater than by clarification processes of the waters in an acid medium;

—limited masses of water required for the full cycle, thanks to the possibility of recycling the clarified water;

—limited masses of slurries and wastes at the outlet of the flotation step; and

—a lesser consumption of chemical reactants, because amongst others there is avoided the use of flocculants in the flotation bath and of correctors of the pH (acids and bases).

Other advantages and characteristics of the composition and of the process of this invention will be still more readily understood from the following examples, which are not to be taken, however, as limiting the inventive idea and scope of the invention.

EXAMPLE 1

The de-inking composition used consisted of:

(A) 21% by weight of a sodium salt of fatty acids R—COO—Na, wherein R is represented by the following mixture of hydrocarbon radicals:

| | |
|---|---|
| $C_{13}$ | 6% |
| $C_{15}$ | 36% |
| $C_{17}$ | 28% |
| $C_{17}$ (unsaturated) | 2% |
| $C_{19}$ | 16% |
| $C_{21}$ | 12% |

(B) 17% by weight of an ethoxylated, non-ionic surfactant of the formula

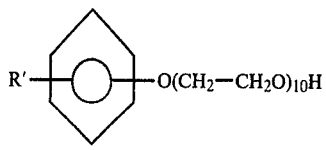

wherein R' is an alkyl chain with an average of 9 carbon atoms;

(C) 5% by weight of a sodium linear alkylbenzene-sulphonate in which the alkyl chain is represented by the following mixture:

| | |
|---|---|
| $C_{10}$ | 12.4% |
| $C_{11}$ | 37.0% |
| $C_{12}$ | 30.9% |
| $C_{13}$ | 19.7% |

(D) 3% by weight of sodium carboxymethylcellulose with m=0.7 (degree of substitution of the sodium-carboxymethylene groups), p=800 (degree of polymerization); and (E) 54% by weight of sodium metasilicate.

A mixture of daily newspapers (with an overall content of fillers of 4% by weight), consisting of 40% of letter-press printings and 60% of offset printings, was treated with this composition.

Into a 35 m³ pulper, fitted with a rotor on its bottom, there were fed in, in the following order:
—10,000 liters of pre-heated water at 35° C.;
—44.8 kg of de-inking composition (equal to 2.8% by weight with respect to the weight of the dry paper);
—1,600 kg of paper; and
—further water, pre-heated at 35° C., until a total quantity of water of 30,000 kg is attained.

In the pulper the suspension had a consistency in solids of 5% and showed a pH of around 10. The pulping time amount to 10 minutes.

The suspension flowing out of the pulper then passed into a storage vat and from there to the washing stage which consisted of the so-called screening and the washing step.

In the final step of the screening, there was obtained a pulp which was diluted with water until a suspension of 4% in solids and a pH of around 9.5 was obtained, which was then passed to washing.

More particularly, the suspension was subjected to filtering during which it was brought to a consistency of 11%.

The 75% of the water obtained from this filtering step was used for diluting the pulp at the end of the screening.

The pulp was then diluted again with water to a concentration of 3.5% and then again filtered until a pulp with a consistency of 21% was obtained. The pulp thus obtained appeared to be de-inked and was thereupon conveyed to the processing line of the paper mill, after having been neutralized to a pH of 6.5 by means of the acid water coming from the continuous paper-producing machine.

The washing waters, containing 1.4 g/lt of fine fibers, fillers and ink, were conveyed into a flotation vat, into which air was blown from below. Air was also blown in into the feeding line of the suspension to be clarified. The pH amounted to about 9, while the dwell time was 2 minutes and 30 seconds.

The outflowing foam, flowing over from the flotation vat, contained 3% by weight of solids prevailingly consisting of ink.

The total volume of waste material at the outlet of the flotation vat corresponded to 4.4% of the total volume at the inlet.

The liquid at the outlet of the flotation vat, free of colored pigments and containing fibers and fillers was recycled, with 16% going to the pulping step and the remainder to the dilution stages of the paste which were necessary for screening and washing. All the water fed into the pulper came from this recycle.

The de-inked paste obtained from the washing contained 1488 kg of paper fibers (dry weight), and thus the recovery yield was 93%.

The 112 kg of missing material consisted partly (24 kg) of inks, fillers and fibers flowing out with the foams over-flowing from the flotation vat, and partly (88 kg) of heavy and light foreign bodies, fibers and colored pigments which are then eliminated during the screening.

The brightness, measured with an ELREPHO apparatus on the de-inked pulp thus obtained, amounted to about 54 degrees. The mean of the brightness values measured on the unprinted borders of the starting newspapers amounted to about 56 degrees.

The brightness measurement carried out on a sheet of paper prepared from the starting paper mixture as such (that is, not de-inked) gave about 42 degrees.

The reclaimed pulp may, if desired, be subjected to a bleaching treatment with hydrogen peroxide, according to techniques per se well known the prior art, downstream of the de-inking treatment of this invention.

EXAMPLE 2

In this case the process of Example 1 was repeated, with the variation consisting in the fact that in the first step of tre treatment in the pulper there was simultaneously carried out a bleaching with hydrogen peroxide.

Practically, besides the de-inking composition, there were added 1.2% by weight of hydrogen peroxide, expressed as pure product, and calculated with respect to the dry weight of the starting paper.

The operational pulper temperature was brought up to 60° C., while the dwell time in the storage vat amounted to about 1 hour. All the other operational procedures remained the same as in Example 1.

The recovery yield of the paper turned out to be 93%, while the brightness of the obtained paste was about 63 degrees.

EXAMPLE 3

In this example a mixture of waste paper (with an over-all content in fillers of 15% by weight) was treated, consisting of 50% of letter-press dailies and 50% illustrated magazines. Of these latter, 50% was coated paper and 50% was uncoated.

The cycle was carried out following the same procedure as in Example 1, thereby obtaining a recovery yield for the paper of 90%.

The brightness measured on the obtained de-inked paste was about 62 degrees. The mean of the brightness values measured on the unprinted borders of the starting newspapers was of about 63 degrees.

The brightness measurement carried out on a sheet of paper prepared from the starting not de-inked paper mixture was of about 54 degrees.

EXAMPLE 4

Example 3 was repeated, but combining it with the bleaching like the one used in Example 2.

The recovery yield of the paper amounted to 90% while the brightness measured on the obtained pulp turned out to be 73 degrees.

EXAMPLE 5

Here was repeated Example 2, on a mixture of waste paper consisting 100% of chemical pulp, essentially consisting of electronic computer tabulations.

The recovery yield of the paper amounted to 95%, while the reflectance index of the obtained de-inked pulp was 82 degrees. The mean of the brightness measurements, carried out on the unprinted borders of the starting papers was 81 degrees. The brightness measured on a sheet of paper prepared from the non-de-inked starting paper, amounted to 69 degrees.

EXAMPLE 6

The process here was that of Example 1, the only difference being that the de-inking composition was used in a quantity corresponding to 3.5% by weight with respect to the dry weight of the paper.

The recovery yield amounted to 93% and the reflectance index of the de-inked pulp amounted to about 55 degrees.

EXAMPLE 7

Example 1 was repeated using a de-inking composition consisting of:

(A) 18% by weight of a sodium salt of fatty acids R—COO—Na, wherein radical R is represented by the following mixture:

| | |
|---|---|
| $C_{13}$ | 6% |
| $C_{15}$ | 36% |
| $C_{17}$ | 28% |
| $C_{\overline{17}}$ | 2% |
| $C_{19}$ | 16% |
| $C_{21}$ | 12% |

(B) 15% by weight of an etoxylated, non-ionic surfactant of the formula:

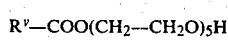

wherein the starting fatty acid is represented by hydrogenated tallow.

(C) 5% by weight of a linear sodium alkylbenzenesulphonate in which the alkyl chain is represented by the following mixture:

| | |
|---|---|
| $C_{10}$ | 12.4% |
| $C_{11}$ | 37.0% |
| $C_{12}$ | 30.9% |
| $C_{13}$ | 19.7% |

(D) 3% by weight of sodium carboxymethylcellulose with
- m=0.7 (degree of substitution of the sodium-carboxymethylene groups),
- n=800 (degree of polymerization).

(E) 59% by weight of sodium metasilicate.

The recovery yield was 93%.

The brightness measured with an ELREPHO apparatus on the de-inked pulp obtained, amounted to about 54 degrees.

EXAMPLE 8

Example 1 was repeated using a de-inking composition consisting of:

(A) 30% by weight of a sodium salt of fatty acids R—COO—Na, wherein radical R is represented by the following mixture:

| | |
|---|---|
| $C_{13}$ | 6% |
| $C_{15}$ | 36% |
| $C_{17}$ | 28% |
| $C_{\overline{17}}$ | 2% |
| $C_{19}$ | 16% |
| $C_{21}$ | 12% |

(B) 11% by weight of an etoxylated, non-ionic surfactant of the formula:

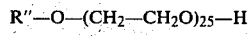

wherein R″ is an alkyl chain with an average of 16 carbon atoms;

(C) 4% by weight of a linear sodium alkylbenzenesulphonate in which the alkyl chain is represented by the following mixture;

| | |
|---|---|
| $C_{10}$ | 12.4% |
| $C_{11}$ | 37.0% |
| $C_{12}$ | 30.9% |
| $C_{13}$ | 19.7% |

(D) 2% by weight of sodium carboxymethylcellulose with
- m=0.7 (degree of substitution of the sodium-carboxymethylene groups),
- n=800 (degree of polymerization).

(E) 53% by weight of sodium metasilicate.

The recovery yield was 94.5%.

The brightness measured with an ELREPHO apparatus on the de-inked pulp obtained, amounted to about 55 degrees.

What is claimed is:

1. In a washing process for de-inking printed waste paper comprising pulping a printed waste paper as an aqueous alkaline suspension in the presence of a de-inking composition and washing the pulped paper with water, thereby obtaining a thickened suspension of paper in water separate from the washing waters which consist of another more dilute suspension containing ink, fillers, and a small amount of residual paper fibers, the improvement comprising (1) using as said de-inking composition, a de-inking composition consisting essentially of:
   (A) a salt of a fatty acid of the formula: R—COO—M wherein R represents one or more hydrocarbon chains selected from the class consisting of saturated and/or unsaturated hydrocarbons; and M represents a metal selected from the class consisting of Na and K; said fatty acid salt being present in an amount between 5% and 32% with respect to the weight of the entire composition;
   (B) a nonionic ethoxylated and/or propoxylated surfactant of the formula:

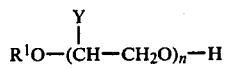

wherein: Y is either H or $CH_3$; $R^1O$ represents the hydrophobic moiety of the molecule and is derived from a compound selected from the class consisting of alkylphenols of formula

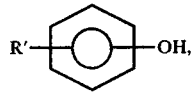

saturated primary fatty alcohols of formula $R''$—$CH_2OH$; saturated secondary fatty alcohols of formula

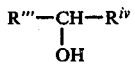

fatty acids of the formula $R^v$—COOH; and mixtures thereof, wherein $R'$, $R''$, $R'''$, $R^{iv}$ and $R^v$ are alkyl chains; and
   n is a number between 2 and 40; said nonionic surfactant being present in an amount between 5% and 25% by weight of the entire composition;
   (c) an anionic surfactant selected from the class consisting of sulphonates of the formula $R^2$—$SO_3$—M'; sulphates of formula $R^3$—O—$SO_3$—M'; and mixtures thereof, wherein:
   $R^2$ is selected from the class consisting of linear paraffin chains, olefin chains, and alkylaryl chains;
   $R^3$ is a paraffin chain; and
   M' is selected from the class consisting of Na, K, $NH_4$ and mono-, di- and tri-substituted alkylamines;
   said anionic surfactant being present in an amount between 2% and 8% with respect to the weight of the entire composition;
   (D) a sodium-carboxylmethyl-cellulose in an amount between 1% and 5% with respect to the weight of the entire composition; and
   (E) an alkaline inorganic salt selected from the class consisting of metasilicate, disilicate, carbonate, borate and polyphosphates, said alkaline inorganic salt being present in an amount between 30% and 80% of the entire composition; the percentages of the components (A), (B), (C), (D), and (E) totaling essentially 100%, said composition being present in an amount of about 1 to about 6% by weight with respect to said paper and the pH during the pulping being from about 9 to about 12;

(2) injecting air or another inert gas in a flotation unit, into the other more dilute suspension coming from the washing operations, to cause a flotation in an alkaline medium at a pH of about 9, without the addition of flocculants resulting in the formation of two phases, the upper-most phase containing ink;

(3) skimming said upper-most phase; and (4) at least partially recycling the lower-most phase comprising de-inked clarified water, residual paper fibers, and fillers in diluted form to the pulping and washing operations.

2. A process according to claim 1 wherein:
   the amount of printed waste paper pulped is from 3–15% by weight, with respect to the total weight of the pulp, and
   the pulping operation is conducted for from 8 to 35 minutes at a temperature from 30° to 80° C.

3. A process as in claim 2 wherein the amount of the de-inking composition is from 2.8 to 3.5% by weight with respect to the weight of the printed wasted paper.

4. A process as in claim 2 wherein the temperature is from 50° to 80° C.

5. A process as in claim 2 wherein the pulping is carried out in the presence of hydrogen peroxide in an amount from 0.5 to 3% by weight with respect to the weight of the printed waste paper.

* * * * *